(No Model.)

J. C. BEACH.
CAR WHEEL.

No. 339,613. Patented Apr. 13, 1886.

Witnesses:
Robt. H. Duncan
Fred. A. Duncan

Inventor
James C. Beach

UNITED STATES PATENT OFFICE.

JAMES C. BEACH, OF BLOOMFIELD, NEW JERSEY.

CAR-WHEEL.

SPECIFICATION forming part of Letters Patent No. 339,613, dated April 13, 1886.

Application filed December 30, 1885. Serial No. 187,123. (No model.)

*To all whom it may concern:*

Be it known that I, JAMES C. BEACH, of Bloomfield, in the county of Essex and State of New Jersey, have invented certain new and useful Improvements in Car and Locomotive Wheels; and I do hereby declare that the following is a full, clear, and exact description of the invention, which will enable others skilled in the art to which it appertains to make and use the same.

The present invention relates to that class of car and locomotive wheels in which the tire is formed separately from the other parts of the wheel, and is secured thereto by mechanical means.

The object of the invention is to effect a safe and secure attachment of the tire to the body of the wheel; and the invention consists, mainly, in providing the tire with a flanged web, which is interlocked with the adjacent parts of the body of the wheel.

Figure 1:
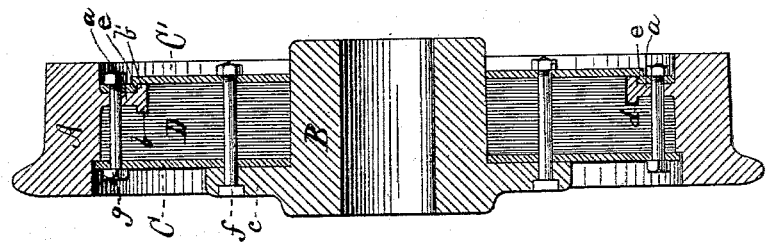
Figure 2:
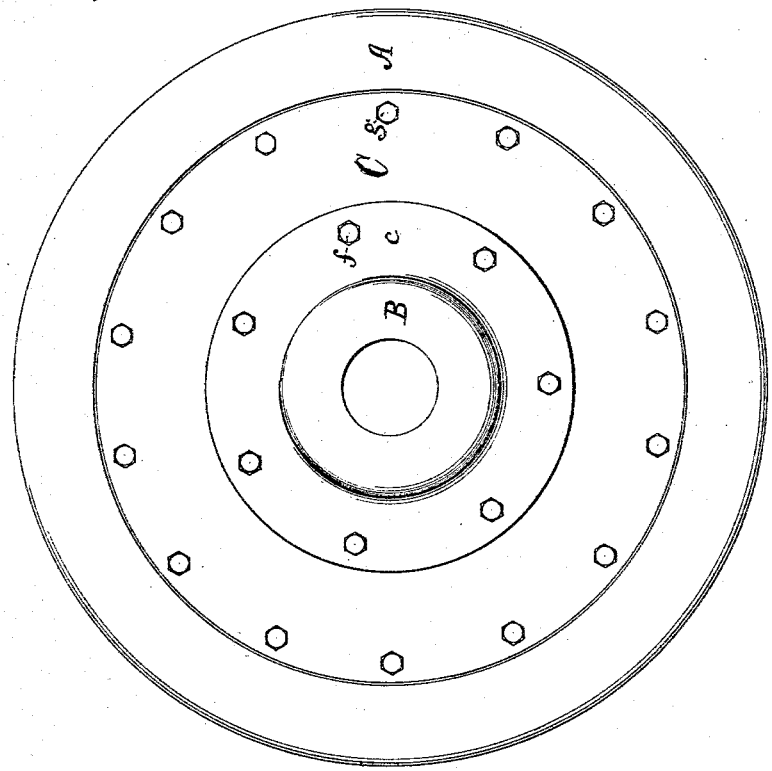

The invention is illustrated in the accompanying drawings, in which Figure 1 is a central section of a wheel containing my invention, and Fig. 2 is an elevation of the inner side or face of the same.

In the drawings, A represents the tire, which is preferably made of cast-steel by forging or rolling, and is provided with an annular web, $a$, projecting from the inner surface of the tire toward the hub of the wheel.

$b$ $b'$ are flanges projecting from the web, preferably near its end.

B is the hub of the wheel, cast or forged from iron or steel.

$c$ is an annular flange or projection on the inner surface of the hub.

C C' are side plates, preferably of wrought-iron or steel, and having their inner and outer peripheries respectively connected with the hub and the tire.

D is the central part of the wheel lying between the hub and the tire. It is provided with a groove, $d$, corresponding with the flange $b$ on the web $a$, and into which the flange $b$ is entered when the parts are in place. The plate C', near its outer periphery, is formed with a shoulder, $e$, which locks over the flange $b'$.

$f$ is a series of bolts or rivets passing through the plates C C', the part D, and the flange $c$ of the hub, and $g$ is another series through the plates, the part D, and the web of the tire, by which means the several parts of the wheel are firmly bound together. It is preferred to form the central part, D, of compressed paper or other slightly elastic and yielding material, for the purpose of absorbing and reducing the shocks and blows received upon the tire, and which otherwise would be communicated to the axle. It is also preferred, in order that the yielding and elastic capacity of the central part may be fully operative, that the outer peripheries of the plates C C' should not be in close contact with the under surface of the tire, and that the holes through the plates for the series of bolts $g$ should be slightly elongated in the direction of the center of the wheel, which arrangements will permit the shocks to be received from the tire directly and wholly upon the center D. It is, however, not intended to limit this invention to a wheel whose central part is constructed of any special material, since it may be of steel or iron, and in such case might be cast with the hub, and at the same time the tire may be secured in accordance with this invention. In case the hub and the central part are cast together or form a single part, the inner plate, C, might be omitted without affecting this invention.

The parts composing the wheel, as shown in the drawings, having been brought to the proper relative sizes, may be conveniently assembled and united as follows: The plate C and the part D may first be forced into place on the hub, and then the tire is forced onto the outer periphery of the central part, the flange $b$ on the web $a$ entering into its groove $d$. The outer plate, C', is then forced into position, the shoulder $e$ overlocking the flange $b'$ of the web. The bolt-holes may then be conveniently bored, and the series of bolts $f$ and $g$ inserted and drawn home by means of their nuts. It is readily seen that in this construction the union of the tire to the body of the wheel is not dependent upon the bolts $g$ alone, but that the tire is actually interlocked with the adjacent parts of the wheel by means of its flanged web. If, by any accident, a section of the tire and its holding-bolts should be broken, such section would still be held in place by the interlocking flanges, since the plate C' would remain in contact with the web $a$, until most or all of the series of bolts $g$ were broken, and would thus hold the flanges in their locked position.

The construction illustrated in Fig. 1 of the drawings shows two flanges on the web. These are designed to give double security to the attachment of the tire. It is, however, not intended to limit this invention to the use of both of these flanges, as the principle of construction will be the same if only one is employed, and this, under ordinary circumstances, will give the desired security. In case only the flange $b$ is used, the plate C' may simply overlap the web $a$, the shoulder $e$ being omitted, so, if only the flange $b'$ is used, the groove $d$ will be unnecessary. In either case the side plate, C', is held in contact with the flanged web, and prevents its flange from being forced out of contact with its groove or shoulder, which, with the flange, forms the required lock.

What is claimed as new is—

1. The combination, in a car-wheel, of a flange on an inwardly-projecting web of the tire, a corresponding groove in the body of the wheel, and a side plate overlapping the web of the tire and secured by a series of bolts passing through the side plate, the body of the wheel, and the web of the tire, substantially as and for the purpose set forth.

2. The combination, in a car-wheel, of a flange on an inwardly-projecting web of the tire, and a side plate shouldered over the flange of the web and secured by a series of bolts passing through the side plate, the body of the wheel, and the web of the tire, substantially as and for the purpose set forth.

3. The combination, in a car-wheel, of a flange on an inwardly-projecting web of the tire, and a corresponding groove in the body of the wheel with a flange on the opposite side of the web, and a side plate shouldered over the flange of the web adjacent to the side plate and secured by a series of bolts passing through the side plate, the body of the wheel, and the web of the tire, substantially as and for the purpose set forth.

JAMES C. BEACH.

Witnesses:
DANIEL H. DRISCOLL,
ROBT. H. DUNCAN.